United States Patent [19]
den Toonder

[11] 4,135,157
[45] Jan. 16, 1979

[54] POLE MOUNTED CONVERTER

[75] Inventor: Pieter den Toonder, Dordrecht, Netherlands

[73] Assignee: Oak Industries Inc., Crystal Lake, Ill.

[21] Appl. No.: 781,533

[22] Filed: Mar. 28, 1977

[51] Int. Cl.² ............................................. H04N 7/16
[52] U.S. Cl. ...................................... 325/308; 358/86
[58] Field of Search ............... 325/308, 309, 461, 464, 325/422, 433; 358/86

[56] References Cited

U.S. PATENT DOCUMENTS

| | | | |
|---|---|---|---|
| 3,249,876 | 5/1966 | Harrison | 325/422 |
| 3,333,198 | 7/1967 | Mandell et al. | 325/308 |
| 3,801,915 | 4/1974 | Ostuni et al. | 325/308 |
| 3,859,596 | 1/1975 | Jannery et al. | 325/308 |
| 3,942,121 | 3/1976 | Bell et al. | 325/464 |

Primary Examiner—Robert L. Griffin
Assistant Examiner—Marc E. Bookbinder
Attorney, Agent, or Firm—Kinzer, Plyer, Dorn & McEachran

[57] ABSTRACT

Cable television converter means includes a plurality of individual converter RF sections, each including an oscillator and a mixer. A plurality of subscriber channel selection means are connected, along with each of the oscillators to a digital tuning system. The digital tuning system sequentially and repetitively is connected to each subscriber selection means and its associated oscillator to provide tuning control during the period of such connection. Tuning control is provided by comparing the frequency of the oscillator with the selected channel oscillator frequency as provided by the subscriber selection means.

12 Claims, 2 Drawing Figures

POLE MOUNTED CONVERTER

SUMMARY OF THE INVENTION

The present invention relates to cable television converters and in particular to an arrangement whereby a plurality of converters are located in a common housing, with common oscillator tuning means positioned in the housing and connected to individual subscriber channel selection apparatus on the subscriber's premises.

One purpose of the invention is a cable television converter which may be located outside of a multiple unit dwelling and which includes converters for a plurality of individual subscribers.

Another purpose is a cable television converter of the type described having common oscillator tuning means which is repetitively and sequentially connected to each of the plurality of converters.

Another purpose is a cable television converter in which oscillator control is provided by comparing oscillator frequency with a selected channel oscillator frequency, and providing a control signal representative of any difference therebetween.

Another purpose is a remotely located cable television converter having a plurality of RF sections and common oscillator control, with the oscillator control being repetitively and sequentially connected and providing control for each RF oscillator.

Another purpose is a cable television conversion means of the type described including means for permitting selected signal reception by different subscribers.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The converter apparatus of the present invention has utility in multi-family dwellings, for example apartment houses or the like. A plurality of converter RF sections, for example four as described herein, are positioned in a common remotely located housing. Such a housing may be located on the outside of the building, for example on a utility pole or the like, and will be adequately sealed against all weather conditions. Also positioned within the converter housing is a means for controlling channel selection of each of the individual converters. The common channel selection means, or common oscillator tuning means, in turn is connected by drop cables or the like to each individual subscriber. The common oscillator tuning means sequentially and repetitively scans each oscillator in each converter RF section and assuming a channel has been selected by the subscriber, will determine if the oscillator frequency is correct, and if not, will provide the appropriate tuning control signal. Thus, there is provided a common tuning facility for a multiple of individual converter RF sections.

An additional advantage is derived by eliminating the conventional oscillator tuning potentiometers and replacing such potentiometers by a frequency control which compares oscillator frequency with the correct frequency for the selected subscriber channel. Tuning potentiometers are susceptible to environmental conditions, whereas, the frequency counter approach to be described herein is not so susceptible, permitting the converter assembly to be located outside of a building. In addition to the common tuning means and elimination of conventional oscillator potentiometers, the invention is advantageous in providing a means for restricting channel selection by individual subscribers, i.e. subscription television or pay television. Data information is received at the common converter location and through a pay TV control will only permit reception of selected channels if a particular subscriber has been programmed to receive that channel.

Figure 1:
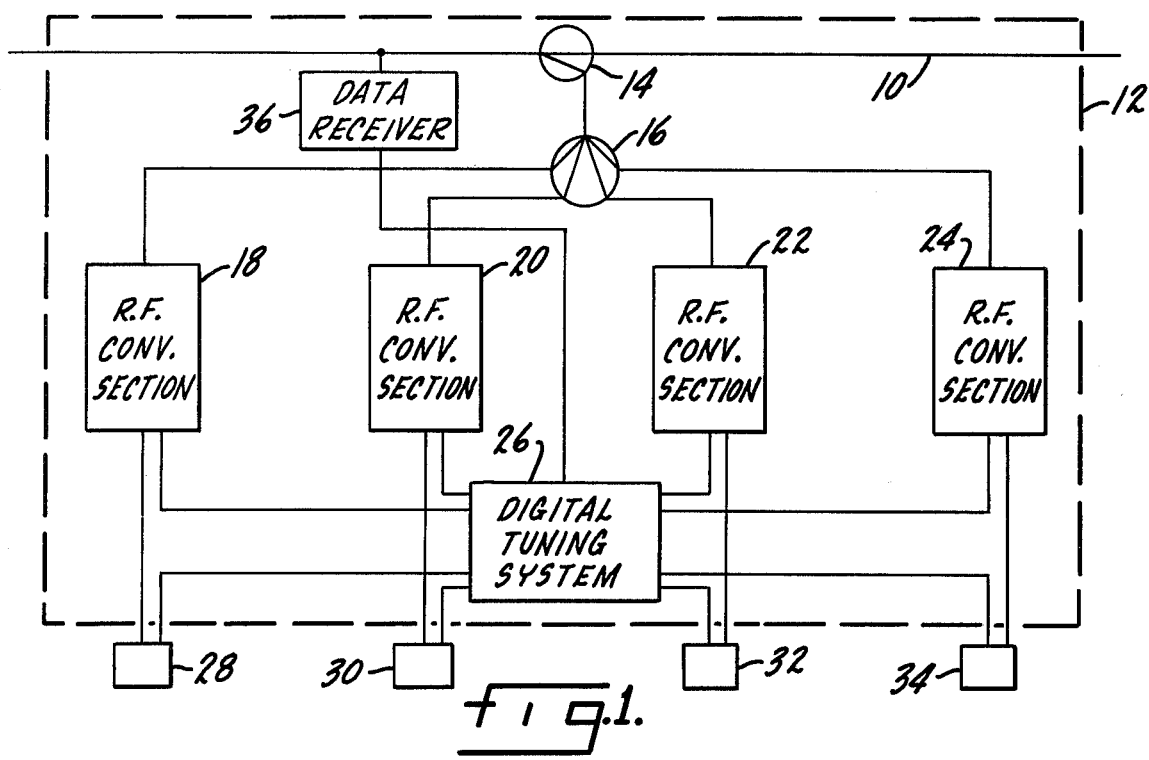
FIG. 1 is a diagrammatic illustration of a cable television conversion means of the type described.

In FIG. 1, a TV cable is indicated at 10, with the cable passing through a weather resistant housing 12. Within the housing is a directional coupler 14 which is connected to a four-way splitter 16, four being the number of converters in the illustrated example. Connected to splitter 16 are four converter-RF sections indicated at 18, 20, 22 and 24. In the described example, the converters will be of the double conversion type, converting an input channel to an IF frequency and then converting the IF frequency to a locally unused channel in the receiver. Each of the RF converter sections 18 are connected to a digital tuning system 26, with each connection line being representative of a two-way connection inasmuch as the oscillator of each RF section will provide an input for the digital tuning system with the tuning system in turn providing the control signal for each oscillator.

A plurality of subscriber control means are indicated at 28, 30, 32 and 34. Each such control is connected to each RF section so as to provide a TV signal for the subscriber. In addition, there is a connection between each subscriber control and the digital tuning system, as will be described more fully hereinafter.

The system, described in general in FIG. 1, is completed by a data receiver 36 connected to cable 10 and to the digital tuning system.

Figure 2:
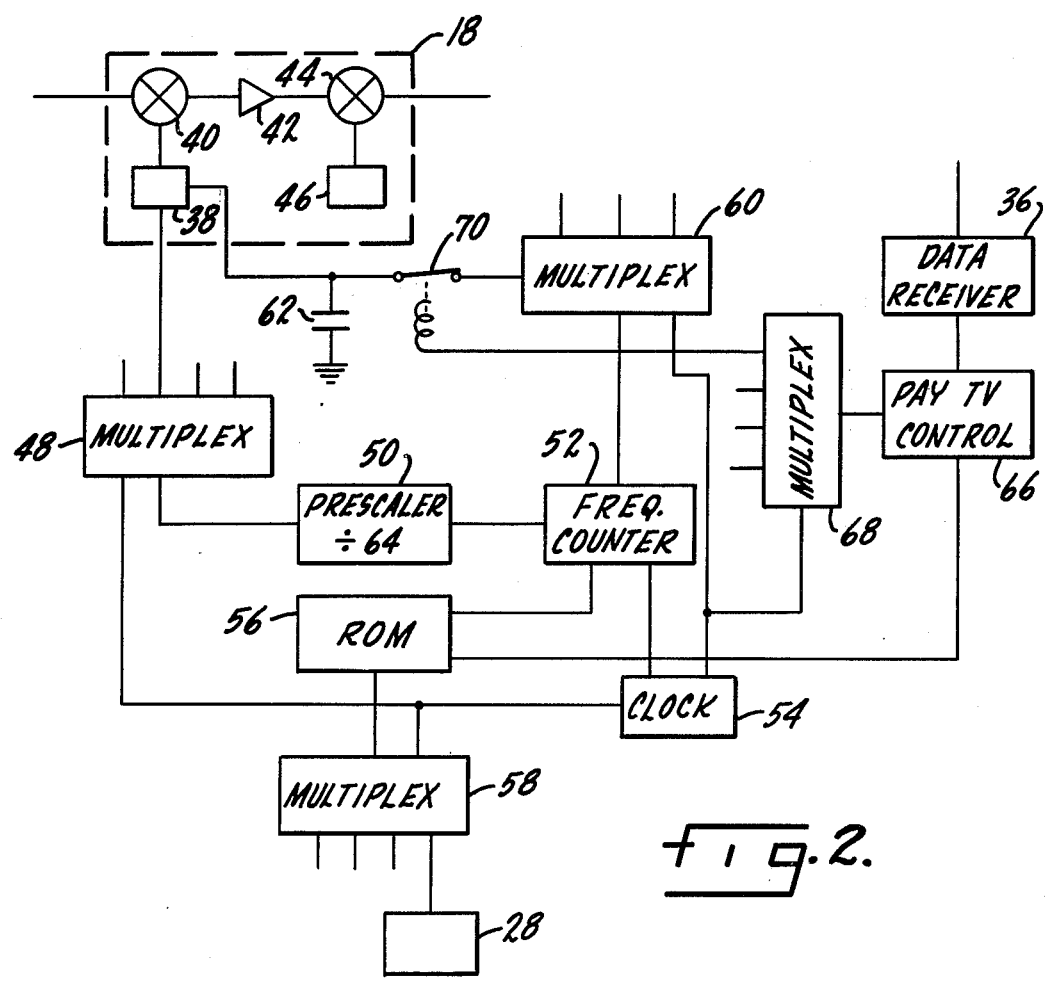
FIG. 2 is a block diagram of the common oscillator tuning means.

FIG. 2 illustrates a single converter RF section and the digital tuning control. It should be understood that each of the converters will be similar and will be controlled in the described manner. Converter section 18 includes an oscillator 38 connected to a first mixer 40. The output of mixer 40 passes through an IF amplifier 42 which is connected to a second mixer 44. Mixer 44 is connected to a second oscillator 46. The output from mixer 44 will be a TV signal usable in a conventional receiver. Again, as indicated above, the described system uses double conversion, although this may not be necessary in every application.

Oscillator 38 is connected through a multiplex circuit 48 to a prescaler 50 which will divide the oscillator frequency by 64. The output from prescaler 50 is connected to a frequency counter 52. The frequency range of oscillator 38 will be approximately 420–680 mhz, with the frequency output from prescaler 50 being approximately 6.5–11 mhz. The input to frequency counter 52 from prescaler 50 will be a pulse train, with the number of pulses being representative of a particular oscillator frequency for a given RF section.

A clock generator 54 provides clock pulses at a one mhz frequency and controls the timing period during which each RF section oscillator is controlled. The timing period may be 6.4 milliseconds, although this should not be a limitation.

Also connected to the frequency counter is a read-only-memory 56 which is connected through a multiplex circuit 58 to each of the subscriber terminals 28. The subscriber terminals will provide a digital signal representative of a selected channel. This signal will cause the read only memory to provide a pulse train to frequency counter 52 representative of the desired oscillator frequency for that selected channel. The output from frequency counter 52 is connected through a multiplex circuit 60 to each of the individual oscillators 38. Each path from multiplex circuit 60 to an oscillator includes a large capacitor 62 which is connected to ground. Thus, the control signal from the frequency counter will charge the individual capacitors, thus maintaining the control voltage for each oscillator during the period that the digital tuning system is controlling other oscillators in the group.

Data receiver 36 is connected to a pay TV control unit 66 which is connected through a multiplex circuit 68 to the operating coil of a switch 70. There is a switch 70 in each path connecting an oscillator 38 to multiplex circuit 60. Pay TV control unit 64 is connected to the read only memory 56.

In operation, each of the RF converter sections will be controlled by the individual subscribers to permit the selection of a desired program. When one subscriber operates his unit to select a channel, he will thereby provide power for the entire system. Clock 54 will cause the multiplex circuits to sequentially connect each oscillator and its associated subscriber control in a repetitive and sequential manner. The period used in the illustrated example is 6.4 milliseconds. Once a subscriber has selected a channel, memory 56 will provide a pulse train representative of the correct oscillator frequency to frequency counter 52. During the period of connection the actual oscillator frequency, divided by 64 by prescaler 50, will be compared in frequency counter 52 with the correct frequency as provided by memory 56. Any deviation in frequency will provide a control signal in the form of a control voltage, which will charge capacitor 62 and be applied to oscillator 38. Depending upon the frequency difference between the selected channel and the actual oscillator frequency, it may take more than one scan before an oscillator reaches the correct frequency. However, considering the rather small scan time, the subscriber will essentially instantaneously see the selected channel. In no event will more than three or four scans be necessary to bring an oscillator to the proper frequency. Not only does the frequency counter provide channel change voltages for capacitor 62 and oscillator 38, but as long as the subscriber control is maintained at a particular channel, frequency counter 52 will continually correct and maintain oscillator 38 at the proper frequency for that channel.

After one oscillator has been scanned and an appropriate control signal provided, clock 54 will cause the multiplex circuits to shift to the next converter. The process will be repeated for all of the converters at a particular converter location. The clock will then cause the first converter to again be scanned and the process is continuously repeated to not only accomodate a change in channels, but to maintain each of the oscillators at the appropriate frequency for the selected channel.

Data receiver 36 will receive properly addressed data in a conventional manner from the transmitter location. This data will be recorded and whenever a subscriber selects a pay channel, in addition to the oscillator frequency signal provided to frequency counter 52, memory 56 will provide a signal indicative of the selected channel and the subscriber to pay TV control 66. In unit 66 the received data indicative of pay programming for selected subscribers will be compared against data from the memory indicative of which subscriber has selected a particular pay channel. Assuming that the channel the subscriber has selected coincides with programming he has requested and been permitted to view, the pay TV control, through multiplex 68, will maintain switch 70 in a closed position, so that the digital tuning system may in fact maintain the local oscillator at the appropriate frequency to receive the selected programming. On the other hand, if a subscriber is not to receive 70 will be opened so that the oscillator cannot be tuned to the correct frequency to receive the program that the subscriber has selected.

Whereas the preferred form of the invention has been shown and described herein, it should be realized that there may be many modifications, substitutions and alterations thereto.

The embodiments of the invention in which an exclusive property or privilege is claimed are defined as follows:

1. A cable television converter including an input for receiving TV signals, a tunable oscillator and a mixer connected to said input and oscillator, means operated by a subscriber for providing a signal representative of the oscillator frequency for a selected TV channel, and signal comparison means connected to said oscillator and subscriber means for comparing said oscillator frequency and the selected channel oscillator frequency and for providing a control signal representative of the difference for said oscillator, said signal comparison means including a frequency counter, a memory circuit connected to said subscriber means and to said frequency counter for providing a pulse train representative of oscillator frequency for the selected TV channel, and a data receiver connected to said input, switch means connected between the output of said frequency counter and said oscillator, and signal control means connected to said data receiver and memory and providing an output signal controlling said switch means, thereby permitting channel selection for a subscriber only if data permitting such selection has been received by said data receiver.

2. The converter of claim 1 further characterized by and including a divide circuit connected between said oscillator and said frequency counter.

3. The converter of claim 1 further characterized by and including a second oscillator and a second mixer, said second oscillator being connected to said second mixer, with the output of said first-named mixer forming a second input for said second mixer.

4. Cable television converter means including an input, a plurality of individual converter RF sections, each including an oscillator and a mixer, each mixer being connected to said input and to its associated oscillator, a plurality of subscriber channel selection means, common oscillator tuning means arranged for connection to each oscillator and each subscriber selection means, said common oscillator tuning means sequentially and repetitively being connected to each oscillator and its associated selection means, and providing oscillator tuning control during the period of each such connection.

5. The converter means of claim 4 further characterized in that said common oscillator tuning means includes means for comparing the frequency of an oscillator with the selected channel oscillator frequency of a subscriber and for providing a control signal representative of the difference for said oscillator.

6. The converter means of claim 5 further characterized in that said common oscillator tuning means includes a frequency counter, and a multiplex connection between said frequency counter and said plurality of oscillators.

7. The converter means of claim 6 further characterized by and including a tuning capacitor connected between each oscillator and said multiplex connection.

8. The converter means of claim 6 further characterized by and including a divide circuit connected to said frequency counter, and a multiplex connection between said divide circuit and each oscillator.

9. The converter means of claim 6 further characterized by and including a memory connected to said frequency counter for providing a pulse train representative of the oscillator frequency of a selected TV channel, and a multiplex connection between said memory and said plurality of subscriber channel selection means.

10. The converter means of claim 9 further characterized by and including clock means for controlling the sequential and repetitive connection between each oscillator and said common oscillator tuning means and said common oscillator tuning means and each subscriber channel selection means.

11. The converter means of claim 4 further characterized in that each RF section includes a second mixer and a second oscillator, said second mixer being connected to said second oscillator and to the output of said first-named mixer.

12. The converter means of claim 4 further characterized by and including a data receiver connected to said input, TV control signal means connected to said common oscillator tuning means and said data receiver, the output of said TV signal control means being connected, through a multiplex circuit, to each of said oscillators for permitting channel selection for each subscriber only if data permitting such selection has been received by said data receiver.

* * * * *